United States Patent
Ashizawa

(10) Patent No.: US 7,726,282 B2
(45) Date of Patent: Jun. 1, 2010

(54) DIRECT INJECTION SPARK IGNITION INTERNAL COMBUSTION ENGINE AND FUEL INJECTION METHOD FOR SAME

(75) Inventor: Takeshi Ashizawa, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 12/282,915

(22) PCT Filed: Jul. 31, 2007

(86) PCT No.: PCT/IB2007/002188

§ 371 (c)(1),
(2), (4) Date: Sep. 15, 2008

(87) PCT Pub. No.: WO2008/015536

PCT Pub. Date: Feb. 7, 2008

(65) Prior Publication Data
US 2009/0133668 A1 May 28, 2009

(30) Foreign Application Priority Data

| Aug. 4, 2006 | (JP) | ............................ 2006-213435 |
| Aug. 8, 2006 | (JP) | ............................ 2006-216065 |
| Aug. 28, 2006 | (JP) | ............................ 2006-230830 |

(51) Int. Cl.
*F02B 31/00* (2006.01)
*F02M 7/28* (2006.01)

(52) U.S. Cl. ...................... 123/435; 123/301; 123/306; 123/262

(58) Field of Classification Search ......... 123/301–302, 123/305, 435, 298, 306–308, 262, 661; 239/533.12
See application file for complete search history.

(56) References Cited

U.S. PATENT DOCUMENTS

| 5,115,776 A | * | 5/1992 | Ohno et al. ................. 123/299 |
| 5,140,958 A | * | 8/1992 | Kobayashi et al. ......... 123/276 |
| 5,259,348 A | * | 11/1993 | Kobayashi et al. ......... 123/260 |
| 5,873,344 A | * | 2/1999 | Kudou et al. ................ 123/295 |
| 6,269,790 B1 | * | 8/2001 | Yi et al. ...................... 123/295 |

(Continued)

FOREIGN PATENT DOCUMENTS

JP  57-66264  10/1955

(Continued)

OTHER PUBLICATIONS

"L' Avenir Du Moteur A Essence Passera Par L' Injection Directe", Revue Technique Automobile, vol. 55, No. 625, pp. MAG20-MAG27 (2000).

*Primary Examiner*—Hai H Huynh
(74) *Attorney, Agent, or Firm*—Oblon, Spivak, McClelland, Maier & Neustadt, L.L.P.

(57) ABSTRACT

A direct injection spark ignition internal combustion engine includes a fuel injector for directly injecting fuel into a cylinder and intensifies a tumble flow using the fuel injected into the cylinder bore at a time near an intake stroke bottom dead center during homogenous combustion. The thrust force of the fuel injected from the fuel injector is set to intensify the tumble flow based on at least one of the state of the combustion chamber, the temperature of the injected fuel, and the orientation of the injection hole.

23 Claims, 6 Drawing Sheets

U.S. PATENT DOCUMENTS

| | | |
|---|---|---|
| 6,336,438 B1 * | 1/2002 | Durnholz et al. ............ 123/301 |
| 6,550,445 B2 * | 4/2003 | Umezono et al. ........... 123/301 |
| 6,668,792 B2 * | 12/2003 | Yamauchi et al. ........... 123/295 |
| 6,672,277 B2 * | 1/2004 | Yasuoka et al. ............. 123/295 |
| 6,681,739 B2 * | 1/2004 | Mamiya et al. ............. 123/295 |
| 6,705,275 B2 * | 3/2004 | Fukuzumi ................... 123/295 |
| 6,976,468 B2 * | 12/2005 | Nakayama et al. .......... 123/295 |
| 7,212,910 B2 * | 5/2007 | Akasaka ..................... 701/112 |
| 7,377,261 B2 * | 5/2008 | Sukegawa et al. ...... 123/406.55 |
| 7,532,973 B2 * | 5/2009 | Akasaka ..................... 701/112 |
| 2004/0187840 A1 | 9/2004 | Nakayama et al. |
| 2008/0135016 A1 * | 6/2008 | Ashizawa et al. ........... 123/301 |
| 2008/0208438 A1 * | 8/2008 | Sukegawa et al. ........... 701/105 |
| 2009/0013962 A1 * | 1/2009 | Ashizawa et al. ........... 123/306 |
| 2009/0071440 A1 * | 3/2009 | Ashizawa ............. 123/406.29 |

FOREIGN PATENT DOCUMENTS

| | | |
|---|---|---|
| JP | 57-66264 | 4/1982 |
| JP | 2000-110621 | 4/2000 |
| JP | 2003-106186 | 4/2003 |
| JP | 2003-176766 | 6/2003 |
| JP | 2003-322022 | 11/2003 |
| JP | 2004-52732 | 2/2004 |
| JP | 2004-68720 | 3/2004 |
| JP | 2005-140083 | 6/2005 |
| JP | 2005 180247 | 7/2005 |
| JP | 2005-264767 | 9/2005 |
| JP | 2006-118465 | 5/2006 |
| JP | 2006-144608 | 6/2006 |
| JP | 2007-327464 | * 12/2007 |
| JP | 2008-38740 | * 2/2008 |
| JP | 2008-38814 | * 2/2008 |
| JP | 2008-51075 | * 3/2008 |
| JP | 2008-95660 | * 4/2008 |
| JP | 2008-106690 | * 5/2008 |

* cited by examiner

DIRECT INJECTION SPARK IGNITION INTERNAL COMBUSTION ENGINE AND FUEL INJECTION METHOD FOR SAME

BACKGROUND OF THE INVENTION

1. Field of the Invention

The invention relates to a direct injection spark ignition internal combustion engine and a fuel injection method for the same.

2. Description of the Related Art

Homogenous combustion is performed by forming a homogenous air-fuel mixture in each cylinder and igniting it at the ignition time that comes at the end of each compression stroke. During such homogenous combustion, a tumble flow is created in the cylinder and the created tumble flow is maintained active until the ignition time at the end of the compression stroke. By doing so, the movement of air-fuel mixture can be maintained until ignition, and this air-fuel mixture movement accelerates the combustion speed, whereby the homogenous combustion progresses in a good condition.

For example, Japanese Patent Application Publication JP-A-2005-180247A proposes a direct injection spark ignition internal combustion engine that has an intake flow control valve in each intake port. In this engine, the intake flow control valve guides the intake air to flow along the upper wall of the intake port and enter the cylinder. By doing so, a tumble flow having a high intensity is created in the cylinder, so that the tumble flow can remain active until the time of ignition at the end of the compression stroke.

According to the direct injection spark ignition internal combustion engine, however, the passage of the intake port needs to be narrowed down by the intake control flow valve when guiding the intake air to flow along the upper wall of the intake port and enter the cylinder. According to this structure, when the required intake air amount is relatively small, a tumble flow can be created in the cylinder without causing any particular problems. However, when the required intake air amount is relatively large, if the passage of the intake port is narrowed down by the intake flow control valve as described above, it may cause a shortage of intake air. In this case, a tumble flow having a high intensity can not be created in the cylinder.

However, in direct injection spark ignition internal combustion engines, even if such intake flow control valves are not provided, each tumble flow can be intensified by setting the fuel injection direction appropriately and injecting a fuel having a large thrust force at the end of each intake stroke. However, in this case, a portion of the injected fuel having a large thrust force may reach the surface of the cylinder bore wall and attach there by being absorbed by the engine oil. If the temperature of the surface of the cylinder bore wall is high, the fuel absorbed in the engine oil will readily evaporate, so no particular disadvantages are concerned. However, if the temperature of the surface of the cylinder bore wall is low, the absorbed fuel will remain absorbed in the engine oil, thus diluting the engine oil. Further, if the temperature of the injected fuel is too high, the injected fuel easily evaporates due to the decompression boiling effect, and therefore the tumble flow can not be intensified appropriately. Further, the tumble flow can not be intensified efficiently using the injected fuel if the fuel injection direction is inaccurate.

SUMMARY OF THE INVENTION

The invention relates to a direct injection spark ignition internal combustion engine that appropriately intensifies tumble flows using injected fuels and to a fuel injection control method for the same.

The first aspect of the invention relates to a direct injection spark ignition internal combustion engine that intensifies a tumble flow using a fuel injected toward a cylinder bore wall at a time near an intake stroke bottom dead center during homogenous combustion and that includes a fuel injector that directly injects fuel into a cylinder. According to this direct injection spark ignition internal combustion engine, the fuel injector injects a fuel having a thrust force that is set to intensify the tumble flow based on at least one of the state of a combustion chamber, the temperature of the injected fuel, and the orientation of an injection hole.

The second aspect of the invention relates to a direct injection spark ignition internal combustion engine according to the first aspect of the invention, wherein when a detected or estimated temperate of the surface of the cylinder bore wall is lower than a predetermined temperature, the thrust force of the injected fuel is decreased as a detected or estimated temperature of the injected fuel decreases.

When the detected or estimated temperature of the surface of the cylinder bore wall is lower than the predetermined temperature, the possibility that the injected fuel evaporates from the surface of the cylinder bore wall is low. Further, the lower the detected or estimated temperature of the injected fuel, the more unlikely it is for the injected fuel to vaporize while moving in the cylinder and thus the larger the amount of fuel that reaches on the surface of the cylinder bore wall. To counter this, in the direct injection spark ignition internal combustion engine according to the second aspect of the invention, when intensifying a tumble flow using the fuel injected at a time near the intake stroke bottom dead center, if the detected or estimated temperature of the surface of the cylinder bore wall is lower than the predetermined temperature, the thrust force of the injected fuel is decreased such that it decreases as the detected or estimated temperature of the injected fuel decreases. This minimizes the possibility that the injected fuel will reach the surface of the cylinder bore wall and thus the possibility of engine oil dilution that may occur when the temperature of the surface of the cylinder bore wall is low. Further, the lower the detected or estimated temperature of the injected fuel, the more unlikely it is for the injected fuel to vaporize while moving in the cylinder. Therefore, even if the thrust force of the injected fuel is decreased as described above, it is still possible to intensify the tumble flow sufficiently by that injected fuel.

The third aspect of the invention relates to a direct injection spark ignition internal combustion engine according to the first aspect of the invention, wherein when the detected or estimated temperature of the injected fuel is higher than a predetermined upper limit value, the fuel injection pressure is decreased such that the fuel injection pressure decreases as the detected or estimated temperature of the injected fuel increases.

When the detected or estimated temperature of the injected fuel is higher than the predetermined upper limit value, the injected fuel vaporizes due to the decompression boiling effect, and therefore the tumble flow cannot be intensified appropriately. To counter this, in the direct injection spark ignition internal combustion engine according to the third aspect of the invention, when the detected or estimated temperature of the injected fuel is higher than the predetermined upper limit value, in order to suppress the decompression boiling effect on the injected fuel, the fuel injection pressure is decreased such that the fuel injection pressure decreases as the detected or estimated temperature of the injected fuel increases.

The fourth aspect of the invention relates to a direct injection spark ignition internal combustion engine according to the first aspect of the invention, wherein when the detected or estimated temperature of the injected fuel is higher than the predetermined upper limit value, the temperature of the injected fuel is decreased to or below the predetermined upper limit value.

When the detected or estimated temperature of the injected fuel is higher than the predetermined upper limit value, the injected fuel vaporizes due to the decompression boiling effect, and therefore the tumble flow cannot be intensified appropriately. To counter this, in the direct injection spark ignition internal combustion engine according to the fourth aspect of the invention, when the detected or estimated temperature of the injected fuel is higher than the predetermined upper limit value, in order to suppress the decompression boiling effect on the injected fuel, the temperature of the injected fuel is decreased to or below the predetermined upper limit value.

The fifth aspect of the invention relates to a direct injection spark ignition internal combustion engine according to the fourth aspect of the invention, wherein the temperature of the injected fuel is reduced by cooling the fuel injector using an air flow.

According to the fifth aspect of the invention, the temperature of the injected fuel can be decreased by cooling the fuel injector using an air flow.

The sixth aspect of the invention relates to a direct injection spark ignition internal combustion engine according to any one of the third to fifth aspects of the invention, wherein when the detected or estimated temperature of the injected fuel is lower than a predetermined lower limit value, the temperature of the injected fuel is increased to or above the predetermined lower limit value.

When the detected or estimated temperature of the injected fuel is lower than the predetermined lower limit value, the injected fuel does not vaporize adequately and therefore the injected fuel partially remains in a liquid state and hits the cylinder bore wall, causing dilution of the engine oil. To counter this, in the direct injection spark ignition internal combustion engine according to the sixth aspect of the invention, when the detected or estimated temperature of the injected fuel is lower than the predetermined lower limit value, the temperature of the injected fuel is increased to or above the predetermined lower limit value, in order to facilitate the vaporization of the injected fuel.

The seventh aspect of the invention relates to a direct injection spark ignition internal combustion engine according to the sixth aspect of the invention, wherein the temperature of the injected fuel is increased by heating a valve-open actuator by energizing the valve-open actuator so as not to open the fuel injector.

According to the seventh aspect of the invention, because the temperature of the injected fuel is increased by heating the valve-open actuator by energizing the valve-open actuator so as not to open the fuel injector, there is no need to newly provide means for heating the injected fuel.

The eighth aspect of the invention relates to a direct injection spark ignition internal combustion engine according to the first aspect of the invention, wherein the fuel injector has a plurality of injection holes and the thrust force of a fuel that is injected from one of the injection holes in a direction substantially parallel to a plane parallel to the tumble flow is made larger than the thrust force of a fuel that is injected from another of the injection holes in a direction crossing the plane parallel to the tumble flow.

The fuel injected in the direction substantially parallel to the plane parallel to the tumble flow intensifies the tumble flow more effectively than the fuel injected in the direction crossing the plane parallel to the tumble flow does. According to the eighth aspect of the invention, therefore, the tumble flow can be efficiently intensified without increasing the entire amount of the injected fuel by making the thrust force of the fuel injected in the direction substantially parallel to the plane parallel to the tumble flow larger than the fuel injected in the direction crossing the plane parallel to the tumble flow. Further, because the fuel is injected in a plurality of directions, the fuel can easily spread throughout the entire area in the cylinder, and therefore the tumble flow can be efficiently intensified.

The ninth aspect of the invention relates to a direct injection spark ignition internal combustion engine according to claim 1, wherein the thrust force of a fuel injected from the fuel injector is increased when the amount of intake air that is introduced per unit time during a fuel injection period is large than when the same amount is small.

According to the ninth aspect of the invention, because the thrust force of fuel injected from the fuel injector is increased when the amount of intake air that is introduced per unit time during the fuel injection period is large than when the same amount is small, it is possible to avoid a situation where the injected fuel penetrates the tumble flow and thus most of the kinetic energy is not utilized to intensify the tumble flow. Thus, the tumble flow can be efficiently intensified without increasing the entire amount of the injected fuel.

The tenth aspect of the invention relates to a fuel injection control method for a direct injection spark ignition internal combustion engine that intensifies a tumble flow using a fuel injected toward a cylinder bore wall at a time near an intake stroke bottom dead center during homogenous combustion and that includes a fuel injector that directly injects fuel into a cylinder. In this fuel injection control method, the thrust force of a fuel injected from the fuel injector is set to intensify the tumble flow based on at least one of the state of a combustion chamber, the temperature of the injected fuel, and the orientation of an injection hole.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
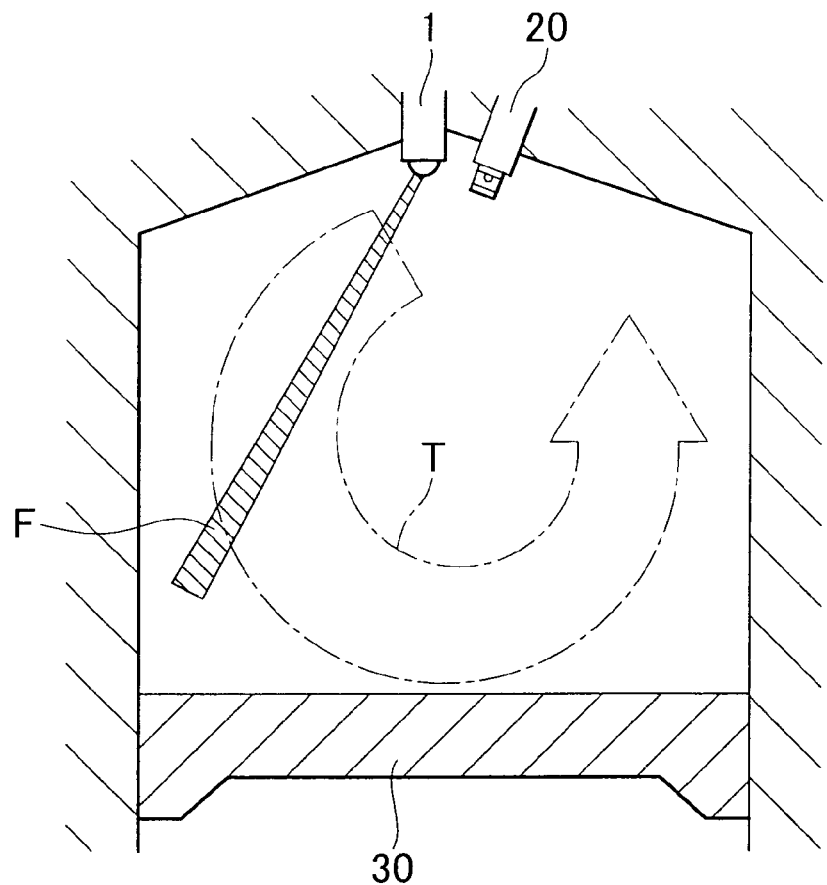
FIG. 1 is a vertical cross-sectional view schematically showing the structure of each cylinder of a direct injection spark ignition internal combustion engine according to the first exemplary embodiment of the invention.

FIG. 1 is a vertical cross-sectional view schematically showing the structure of each cylinder of a direct injection spark ignition internal combustion engine according to the first exemplary embodiment of the invention. Specifically, FIG. 1 shows the state near the bottom dead center on an intake stroke (will be referred to as "intake stroke bottom dead center") that corresponds to the time of fuel injection for homogenous combustion. Referring to FIG. 1, a fuel injector 1 is provided at substantially the center of the upper area of the cylinder to inject fuel directly into the cylinder. Also, in the cylinder, an ignition plug 20 is provided near the fuel injector 1 on the intake valve side thereof and a piston 30 is provided. Although not shown in the drawings, a pair of intake valves are provided on the right side above the cylinder and a pair of exhaust valves are provided on the left side above the cylinder.

In the direct injection spark ignition internal combustion engine of the first exemplary embodiment, homogenous combustion is performed by injecting fuel directly into each cylinder so that a homogenous air-fuel mixture is formed at the time of ignition in the cylinder and then igniting the formed homogenous air-fuel mixture by an electric spark. For example, the crank angle at which to start fuel injection is set based on the fuel injection amount such that the fuel injection will end at a crank angle near the intake stroke bottom dead center, or the crank angle at which to start fuel injection is set to the latter half of each intake stroke irrespective of the fuel injection amount.

The fuel injector 1, as shown in FIG. 1, injects fuel F obliquely downward to the exhaust valve side wall of the cylinder bore (preferably to the lower portion of the exhaust valve side wall of the cylinder bore). The thrust force of the fuel F injected from the fuel injector 1 is set such that the front of the injected fuel F reaches the point at least 60 mm away from the injection hole 1 msec after the beginning of the fuel injection.

As the injected fuel F having such a large thrust force moves obliquely downward from substantially the center of the upper side of the cylinder toward the exhaust valve side wall of the cylinder bore, the thrust force of the injected fuel F intensifies a tumble flow T that has been created in the cylinder. The tumble flow T flows downward in the exhaust valve side of the cylinder and upward in the intake valve side. The tumble flow T thus intensified remains active until the latter half of the compression stroke, whereby the movement of air-fuel mixture can be kept strong until the time of ignition that comes at the end of the compression stroke. The strong movement of air-fuel mixture increases the combustion speed, so that the homogenous combustion progresses in a good condition.

The shape into which fuel F is injected may be arbitrarily selected from among various shapes. For example, using a single injection hole, the fuel F can be injected into, for example, the shape of a solid or hollow cone. Further, using a slit-shaped injection hole, the fuel F can be injected into a relatively thin fan-like shape. Further, using an arc-slit-shaped injection hole, the fuel F can be injected into a relatively thin arc shape, the convex side of which faces the upper side and the exhaust valve side. Further, using a combination of two or more straight-slit-shaped injection holes, the fuel F can be injected into a zigzag shape. In short, the fuel F may be injected into any shape as long as the thrust force of the injected fuel F can be made large enough to accelerate the tumble flow T in the cylinder.

In the first exemplary embodiment, because the ignition plug 20 is provided on the intake valve side of the fuel injector 1, injector the ignition plug 20 does not get wet due to the fuel that is injected from the fuel injector 1 toward the exhaust valve side wall of the cylinder, and therefore injector the ignition plug 20 can appropriately generate electric arcs at the time of ignition.

In the first exemplary embodiment, in order to save the fuel consumption, the air-fuel ratio for homogenous combustion is set to a ratio that is leaner than the stoichiometric air-fuel ratio (preferably a lean air-fuel ratio that suppresses the production of NOx), and therefore homogenous combustion tends to progress slowly. Thus, increasing the combustion speed as described above provides various advantages. Meanwhile, the air-fuel ratio for homogenous combustion may alternatively be set to the stoichiometric air-fuel ratio or to a rich air-fuel ratio. In this case, too, increasing the combustion speed provides various advantages.

Meanwhile, when fuel having a large thrust force is injected toward the exhaust valve side wall of the cylinder bore at a time near the intake stroke bottom dead center, some liquid portion of the injected fuel may reach the surface of the cylinder bore wall and attach there by being absorbed in the engine oil. At this time, if the temperature of the surface of the cylinder bore wall is equal to or higher than a predetermined temperature, the fuel absorbed in the engine oil will readily evaporate, so no particular disadvantages are concerned. However, if the temperature of the surface of the cylinder bore wall is lower than the predetermined temperature, the absorbed fuel will remain absorbed in the engine oil, thus diluting the engine oil.

However, such engine oil dilution can be prevented by, when the temperature of the surface of the cylinder bore wall is lower than the predetermined temperature, weakening the thrust force of the fuel F injected from the fuel injector 1 at a time near the intake stroke bottom dead. That is, weakling the thrust force of the injected fuel F makes it difficult for the injected fuel F to reach the surface of the cylinder bore wall and thus reduces the possibility of engine oil dilution. Note that the temperature of the surface of the cylinder bore wall can be obtained in various ways. For example, because the temperature of the surface of the cylinder bore wall increases as the temperature of the coolant increases, the temperature of the surface of the cylinder bore can be estimated based on the temperature of the coolant. Further, the combustion temperature increases as the engine speed increases, as the injection amount increases, and as the ignition timing is advanced. The temperature of the surface of the cylinder bore wall increases as the combustion temperature increases. Thus, the temperature of the surface of the cylinder bore wall can be estimated based on the engine speed, the ignition timing, and/or the ignition timing. In this case, preferably, the estimation of the temperature of the surface of the cylinder bore wall is made by factoring also in the fact that the lower the engine oil temperature at the oil pan, the more the engine oil cools the surface of the cylinder bore wall when supplied thereto. Alternatively, the temperature of the surface of the cylinder bore wall may be obtained by detecting it. However, if the thrust force of the injected fuel F is merely weakened, the tumble flow T can not be intensified sufficiently, even though engine oil dilution can be avoided.

Figure 2:
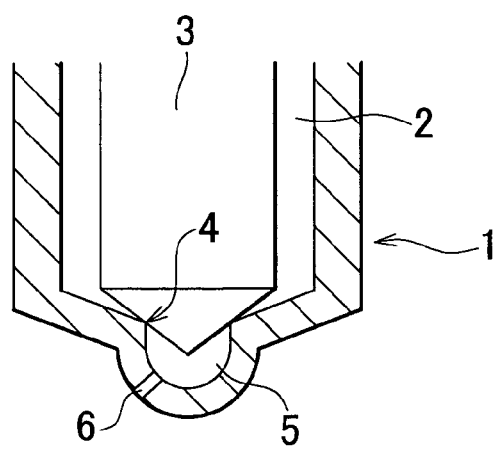
FIG. 2 is a cross-sectional view schematically showing the lower end of the fuel injector.

FIG. 2 is a cross-sectional view showing the lower end portion of the fuel injector 1. Referring to FIG. 2, a fuel passage 2 is formed which extends in the axial direction of the fuel injector 1, and a valve element 3 is arranged in the fuel passage 2. The valve element 3 is movable in the fuel passage 2 in the axial direction of the fuel injector 1. A fuel sump 5 is formed below a valve seat portion 4 in the fuel passage 2. The seal portion of the valve element 3, which is provided at the lower end thereof, is seated on the valve seat portion 4. An injection hole 6 is formed, which communicates with the fuel sump 5. The fuel passage 2 is filled up with the high pressure fuel supplied from a fuel-pressure accumulating chamber (not shown in the drawing).

In the fuel injector 1 structured as described above, fuel is injected as follows. First, the valve element 3 is lifted up. At this time, the seal portion of the valve element 3 thus moves away from the valve seat portion 4, whereby the high pressure fuel in the fuel passage 2 starts entering the fuel sump 5. Then, in response to the fuel pressure in the fuel sump 5 exceeding the pressure in the cylinder, the fuel in the fuel sump 5 starts to be injected from the injection hole 6. Then, the valve element 3 moves down and the seal portion of the valve element 3 is thus seated on the valve seat portion 4 in the fuel passage 2, whereby the flow of the high-pressure fuel from the fuel passage 2 to the fuel sump 5 is interrupted and thus the fuel pressure in the fuel sump 5 starts decreasing. Then, the fuel injection through the injection hole 6 stops when the fuel pressure in the fuel sump 5 becomes lower than the pressure in the cylinder.

Figure 3A:
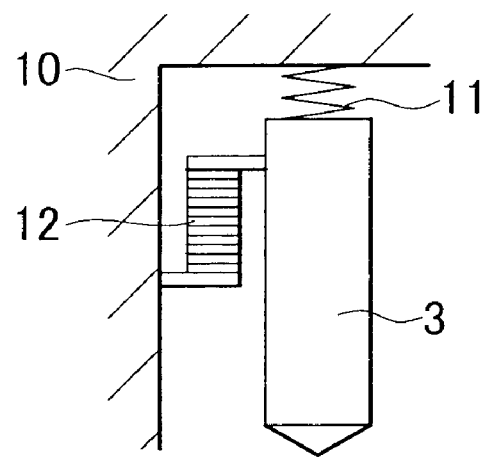
FIG. 3A and FIG. 3B are views schematically showing exemplary structures of a mechanism that variably, and continuously, changes the lift of the valve element of the fuel injector.
Figure 3B:
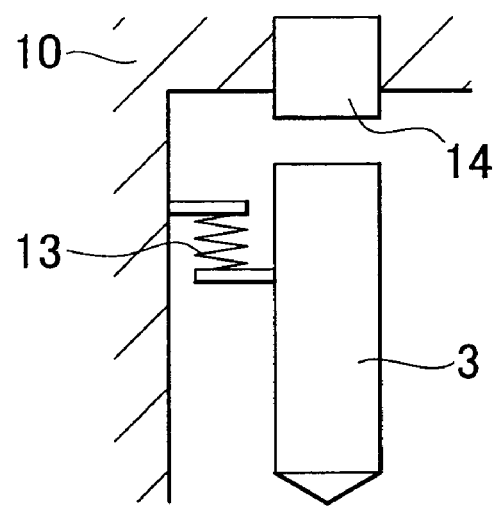

The internal combustion engine of the first exemplary embodiment is provided with a mechanism that variably, and continuously, changes the lift of the valve element 3 of the fuel injector 1. FIG. 3A and FIG. 3B schematically show exemplary structures of this mechanism. In the example shown in FIG. 3A, the valve element 3 is urged in the valve closing direction by a valve-close spring 11 that is provided between the valve element 3 and a valve main body 10. A piezoelectric strain actuator (piezo actuator) 12 is also provided between the valve element 3 and the valve main body 10. As the piezoelectric strain actuator 12 extends, the valve element 3 moves upward, whereby the fuel injector 1 opens. That is, the amount that the piezoelectric strain actuator 12 extends can be adjusted by controlling the voltage supplied to the piezoelectric strain actuator 12. Thus, the lift of the valve element 3 can be controlled continuously by controlling the voltage supplied to the piezoelectric strain actuator 12.

On the other hand, in the example shown in FIG. 3B, the valve element 3 is urged by a valve-close spring 13 that is provided between the valve element 3 and the valve main body 10, and an electromagnetic actuator (solenoid actuator) 14 is provided in the fuel injector main body 10. The electromagnetic actuator 14 is arranged to face the base portion of the valve element 3 so that the electromagnetic attracting force of the electromagnetic actuator 14 acts in the direction to lift the valve element 3 upward, that is, in the direction to open the fuel injector 1. As such, the lift of the valve element 3 can be continuously controlled by changing the electromagnetic attracting force on the valve element 3 by controlling the voltage supplied to the electromagnetic actuator 14.

As described above, in the first exemplary embodiment, the lift of the valve element 3 can be continuously controlled. Therefore, when the detected or estimated temperature of the surface of the cylinder bore wall is lower than the predetermined temperature, the temperature of the fuel to be injected from the fuel injector 1 is obtained, and the lift of the valve element 3 is controlled such that it decreases as the obtained fuel temperature decreases. This fuel temperature can be obtained by, for example, detecting it using a temperature sensor provided in the fuel passage 2. Alternatively, the fuel temperature may be estimated based on the coolant temperature, because the fuel temperature increases as the coolant temperature increases. As the lift of the valve element 3 is reduced, the clearance between the seal portion of the valve element 3 and the valve seat portion 4 narrows down, and therefore the pressure loss at the clearance increases, whereby the pressure of the fuel injected from the fuel sump 5 decreases. That is, as the lift of the valve element 3 is reduced, the thrust force of the fuel decreases.

As such, when the detected or estimated temperature of the surface of the cylinder bore wall is lower than the predetermined temperature, the thrust force of the fuel is reduced such that it decreases as the temperature of the injected fuel decreases. The lower the temperature of the injected fuel, the more unlikely it is for the injected fuel to vaporize while moving in the cylinder and thus the more easily the injected fuel reaches the surface of the cylinder bore wall. To counter this, in this exemplary embodiment, the thrust force of the injected fuel is weakened in order to minimize the possibility that the injected fuel reaches the surface of the cylinder bore wall and thus the possibility of engine oil dilution that may occur when the temperature of the surface of the cylinder bore wall is low. Further, the lower the detected or estimated temperature of the injected fuel, the more unlikely it is for the injected fuel to vaporize while moving in the cylinder. That is, assuming that there are two or more fuels that have been injected such that their thrust forces become equal to each other, the coolest of the fuels intensifies the tumble flow most effectively. Therefore, even if the thrust force of the injected fuel is reduced as the detected or estimated temperature of the injected fuel decreases, it is still possible to intensify the tumble flow sufficiently by that injected fuel.

As described above, in the first exemplary embodiment, the fuel injection pressure is controlled by changing the lift of the valve element 3 continuously, so as to control the thrust force of the injected fuel continuously as needed. Alternatively, the fuel injection pressure may be controlled by returning a portion of the fuel in the fuel passage 2 to the fuel tank, or other, with the lift of the valve element 3 unchanged. In this case, more specifically, the fuel injection pressure is controlled by changing the fuel pressure in the fuel passage 2 continuously by controlling the amount of the returned fuel continuously.

Further, because the thrust force of the injected fuel decreases as the amount of the injected fuel decreases, the thrust force of the injected fuel can be reduced also by splitting the fuel injection. That is, when the detected or estimated temperature of the surface of the cylinder bore wall is lower than the predetermined temperature, the fuel injection for injecting the required amount of fuel may be divided into two or more split injections. In this case, the number of split injections is increased as the detected or estimated temperature of the injected fuel decreases, so that the thrust force of each injected fuel decreases. Note that the required fuel amount is set in accordance with the engine operation state. For example, the required fuel amount is increased as the engine speed increases and as the engine load increases.

In the case where the above-described split fuel injections are performed, the thrust force of each injected fuel can be adjusted in steps. For example, in the case where each injection can be divided into eight split injections at maximum, the thrust force of each injected fuel can be adjusted in eight steps. The aforementioned engine oil dilution can be prevented if the thrust force of the injected fuel is adjustable at least in three steps including the step for the normal state where the detected or estimated temperature of the surface of the cylinder bore wall is equal to or higher than the predetermined temperature, so that the tumble flow can be intensified in two steps in accordance with the temperature of the injected fuel. Namely, it is sufficient that the lift of the valve element 3 and the fuel pressure in the fuel passage 2 be controllable at least in three steps.

This is how homogenous combustions are performed in the first exemplary embodiment. Further, when the engine load is smaller than a predetermined load, stratified combustions may be performed by injecting fuel from the fuel injector 1 in the latter half of each compression stroke. For the purpose of enabling stratified combustions, typically, a cavity is formed in the top face of each piston 30, and fuel is injected into the cavity in the latter half of each compression stroke. At this time, the cavity guides the injected fuel to near the ignition plug 20, whereby a combustible air-fuel mixture is formed near the ignition plug 20. Further, in the case where the ignition plug 20 is provided on the exhaust valve side of the fuel injector 1, combustible air-fuel mixtures can be directly formed near the ignition plug 20 by simply injecting fuel from the fuel injector 1.

Figure 4:
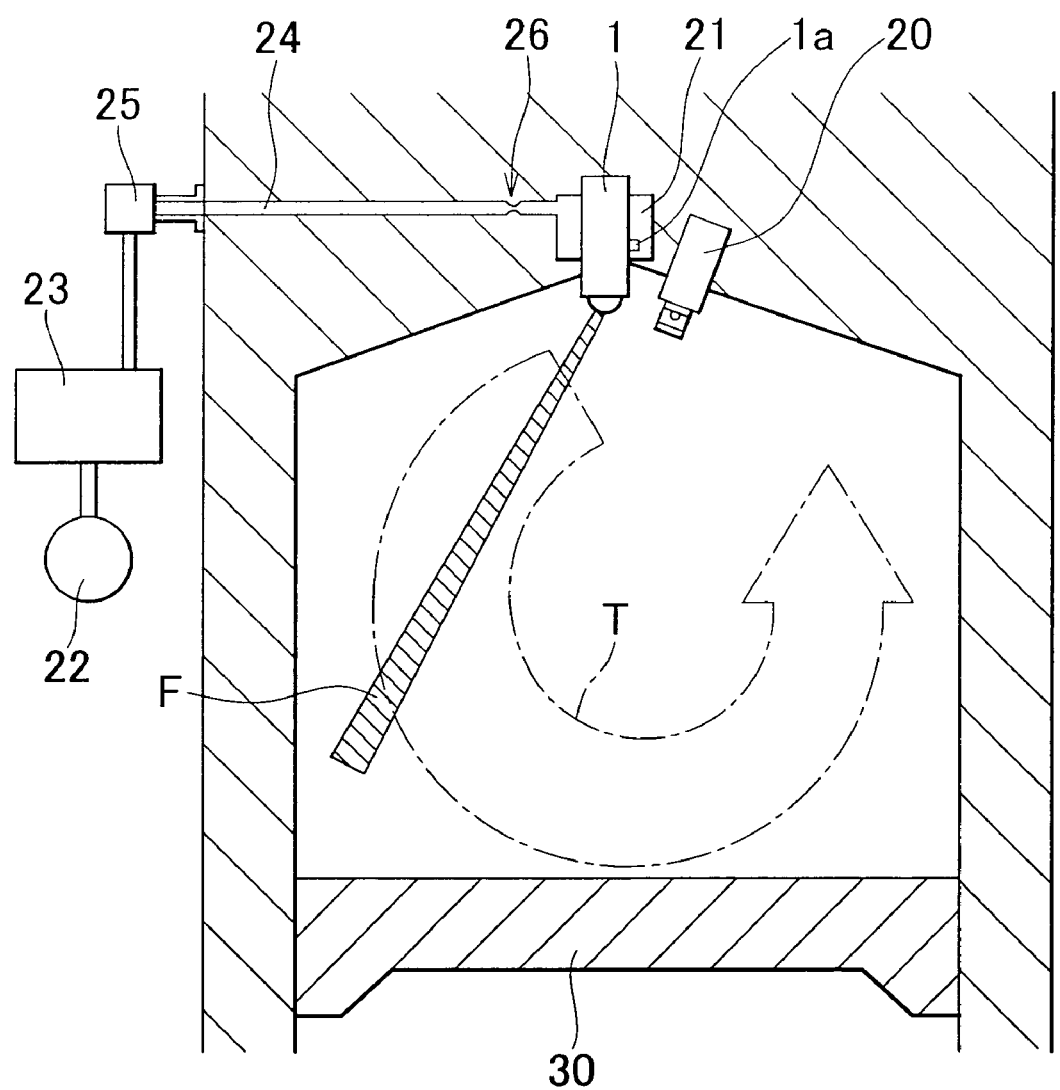
FIG. 4 is a vertical cross-sectional view schematically showing the structure of each cylinder of a direct injection spark ignition internal combustion engine according to the second exemplary embodiment of the invention.

FIG. 4 is a vertical cross-sectional view schematically showing the structure of each cylinder of a direct injection spark ignition internal combustion engine according to the second exemplary embodiment of the invention. Specifically, FIG. 2 shows the state near the intake stroke bottom dead center that corresponds to the time of fuel injection for homogenous combustion. In the second exemplary embodiment, the components and parts that are the same as those in the first exemplary embodiment are denoted by the same numerals, and their descriptions will be omitted. Note that the direct injection spark ignition internal combustion engine of the second exemplary embodiment also incorporates the structure of the lower end of the fuel injector 1 that is shown in FIG. 2 and either of the structures for variably, and continuously, controlling the lift of the valve element 3 that are shown in FIG. 3A and FIG. 3B by way of examples. In the following, a description will be made only of the structures of the second exemplary embodiment that are different from those of the first exemplary embodiment. In the meantime, in order to increase the thrust force of injected fuel, the fuel injection pressure needs to be set to a relatively high level. Thus, when the temperature of injected fuel is higher than a predetermined upper limit value, the injected fuel may vaporize due to the decompression boiling effect immediately after injected from the fuel injector 1. Such vaporization causes a sharp decrease in the thrust force of the injected fuel, and therefore the tumble flow T cannot be intensified.

In the direct injection spark ignition internal combustion engine of the second exemplary embodiment, a space 21 is provided around the fuel injector 1 in the cylinder head, so that the airflow supplied to the space 21 cools the fuel injector 1. FIG. 4 shows an air pump 22, which may either be a mechanically-driven air pump or an electrically-driven air pump, an air accumulating chamber 23 that is filled with the air compressed by the air pump 22, and a temperature sensor 1a that detects the temperature of the fuel injector 1. The air accumulating chamber 23 communicates with the space 21 in the cylinder head via a passage 24 in which a control valve 25 is provided. An aperture 26 is formed in the passage 24 near the space 21. The space 21 is opened to the atmosphere via a passage other than the passage 24.

Preferably, the air pump 22 is driven to accumulate compressed air in the air accumulating chamber 23 when the engine speed is decreasing. This is because a decrease in the engine output during deceleration of the engine speed does not cause any disadvantages. The higher the temperature of the fuel injector 1 detected by the temperature sensor 1a, the higher the temperature of the injected fuel would be. Thus, if the temperature of the injected fuel that is estimated based on the detected temperature of the fuel injector 1 is higher than the predetermined upper limit value, the control valve 25 is opened at the time of opening the fuel injector 1 or prior to opening the fuel injector 1, so that the compressed air in the air accumulating chamber 23 bursts into the space 21. The fuel injector 1 is cooled by the air flow in the space 21 and the temperature of the fuel in the fuel injector 1 decreases. As such, the temperature of the injected fuel is reduced to or below the predetermined upper limit value, eliminating the possibility that the injected fuel vaporizes due to the decompression boiling effect immediately after injected from the fuel injector 1. As a result, the tumble flow T can be intensified by the injected fuel.

When the temperature of injected fuel is lower than a predetermined lower limit value, the injected fuel does not vaporize adequately in the cylinder, and therefore most of the injected fuel remains in a liquid state and hits the cylinder bore wall, thus causing dilution of the engine oil. To counter this, the amount of air flow supplied to the space 21 via the control valve 25 may be controlled such that the detected or estimated temperature of injected fuel falls in the range from the predetermined lower limit value to the predetermined upper limit value. In the structure of the second exemplary embodiment, because the compressed air passes through the aperture 26 before bursting into the space 21, the internal energy of the compressed air decreases and its temperature decreases accordingly. Therefore, the fuel injector 1 can be cooled effectively.

While the temperature of the injected fuel is estimated based on the temperature of the outer surface of the fuel injector 1 in the second exemplary embodiment, the temperature of the injected fuel may be obtained in various other fashions. For example, the temperature of the injected fuel may be detected by providing a temperature sensor in the fuel passage of the fuel injector 1. Further, because the temperature of the injected fuel increases as the coolant temperature increases, the temperature of the injected fuel may be estimated based on the coolant temperature.

In the second exemplary embodiment, the lift of the valve element 3 is continuously adjustable as described above. Therefore, for example, in order to avoid a sharp decrease in the thrust force of the injected fuel that occurs when the injected fuel vaporizes due to the decompression boiling effect immediately after injected from the fuel injector 1, the lift of the valve element 3 at the open position of the fuel injector 1 may be made smaller when the temperature of the injected fuel is higher than the predetermined upper limit value than in the normal state, and optimally, the lift of the valve element 3 may be reduced as the detected or estimated temperature of the injected fuel increases. In this case, because the clearance between the valve element 3 and the valve seat portion 4 decreases as the lift of the valve element 3 is reduced, the pressure loss at the clearance increases and therefore the pressure of the fuel injected from the fuel sump 5 decreases.

As such, if the detected or estimated temperature of the injected fuel is higher than the predetermined upper limit temperature, the fuel injection pressure is reduced such that the fuel injection pressure decreases as the detected or estimated temperature of the injected fuel increases. This eliminates the possibility that the injected fuel vaporizes due to the decompression boiling effect immediately after injected from the fuel injector 1, and therefore the tumble flow T can be intensified sufficiently.

While the fuel injection pressure is controlled by changing the lift of the continuously in the second exemplary embodiment described above, the fuel injection pressure may alternatively be controlled by returning a portion of the fuel in the fuel passage 2 to the fuel tank, or other, with the lift of the valve element 3 unchanged and controlling the amount of the returned fuel continuously. Further, in the second exemplary embodiment described above, the lift of the valve element 3 and the pressure of the fuel in the fuel passage 2 are controlled continuously. However, if the lift of the valve element 3 and the pressure of the fuel in the fuel passage 2 are adjustable at least in three steps including the step for the normal state, the vaporization of the injected fuel due to the decompression effect immediately after injection can be suppressed and therefore the tumble flow T can be appropriately intensified using the injected fuel. In this case, when the detected or estimated temperature of the injected fuel is higher than the predetermined upper limit value, the fuel injection pressure is selectively adjusted between the two fuel injection pressures such that the fuel injection pressure decreases as the detected or estimated temperature of the injected fuel increases.

As described above, when the temperature of the injected fuel is lower than the predetermined lower limit value, the injected fuel does not vaporize adequately in the cylinder and therefore the injected fuel partially remains in a liquid state and hits the cylinder wall. In this case, although the tumble flow can be intensified sufficiently, the engine oil dilutes. To counter this, preferably, if the detected or estimated temperature of the injected fuel is lower than the predetermined lower limit value, the temperature of the injected fuel is increased to or above the predetermined lower limit value so as to facilitate the vaporization of the injected fuel in the cylinder. For this purpose, for example, an electric heater may be provided in the space 21 in the cylinder head to heat the fuel injector 1.

Further, when the detected or estimated temperature of the injected fuel is lower than the predetermined lower limit value, the temperature of the injected fuel may be increased to or above the predetermined lower limit value by increasing the temperature of the fuel in the fuel passage 2 by energizing the valve-open actuator (the piezoelectric strain actuator 12 or the electromagnetic actuator 14) such that the fuel injector 1 remains closed. In this case, it is not necessary to additionally provide an electric heater, or the like, to increase the temperature of the injected fuel.

In the meantime, the higher the engine speed, the higher the cylinder temperature becomes near the intake stroke bottom dead center and thus the more easily the injected fuel vaporizes. In view of this, the predetermined upper limit value and the predetermined lower limit value may be increased as the engine speed increases.

This is how homogenous combustions are performed in the second exemplary embodiment. Further, when the engine load is smaller than a predetermined load, stratified combustions may be performed by injecting fuel from the fuel injector 1 in the latter half of each compression stroke. For the purpose of enabling stratified combustions, typically, a cavity is formed in the top face of each piston 30, and fuel is injected into the cavity in the latter half of each compression stroke. At this time, the cavity guides the injected fuel to near the ignition plug 20, whereby a combustible air-fuel mixture is formed near the ignition plug 20. Further, in the case where the ignition plug 20 is provided on the exhaust valve side of the fuel injector 1, combustible air-fuel mixtures for stratified combustion can be directly formed near the ignition plug 20 by injecting fuel from the fuel injector 1.

Figure 5:
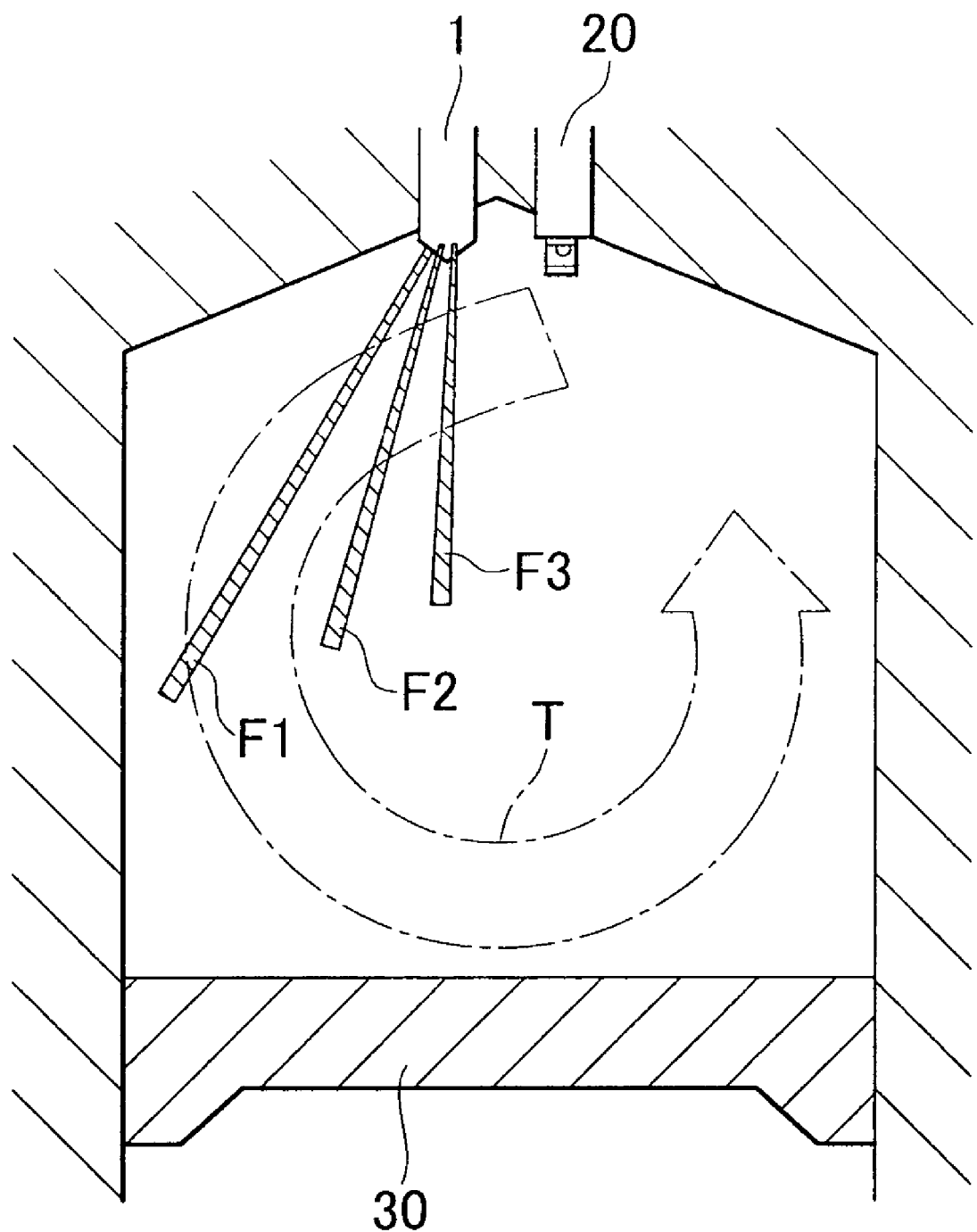
FIG. 5 is a vertical cross-sectional view schematically showing the structure of each cylinder of a direct injection spark ignition internal combustion engine according to the third exemplary embodiment of the invention.
Figure 6:
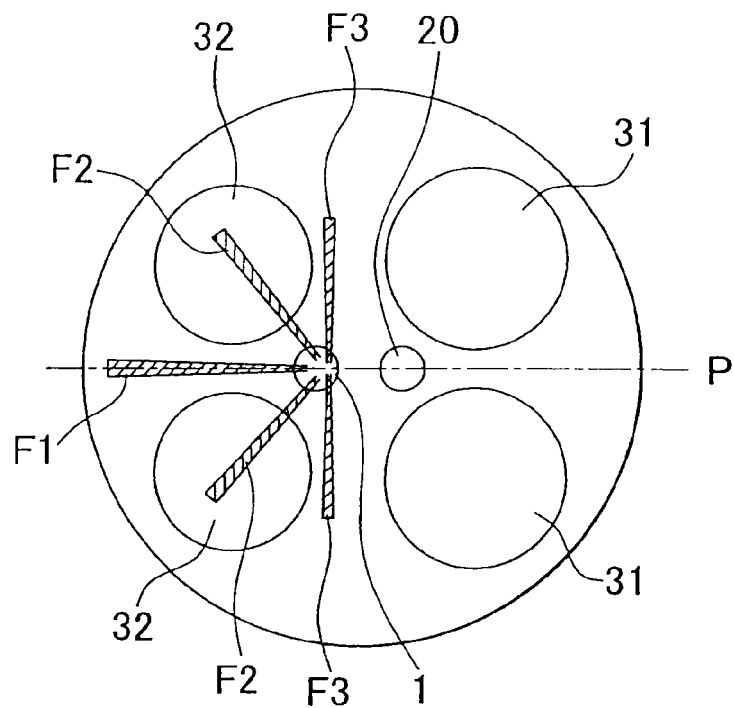
FIG. 6 is a view of the cylinder shown in FIG. 5 that is seen from the piston side.

FIG. 5 is a vertical cross-sectional view showing the structure of each cylinder of a direct injection spark ignition internal combustion engine according to the third exemplary embodiment of the invention. Specifically, FIG. 5 shows the state near the intake stroke bottom dead center that corresponds to the time of fuel injection for homogenous combustion. In the third exemplary embodiment, the components and parts that are the same as those in the first exemplary embodiment are denoted by the same numerals, and their descriptions will be omitted. FIG. 6 shows a view of the cylinder shown in FIG. 5 that is seen from the piston side. As shown in FIG. 6, a pair of intake valves 31 are provided on the right side above the cylinder shown in FIG. 5, and a pair of exhaust valves 32 are provided on the left side.

In the direct injection spark ignition internal combustion engine of the third exemplary embodiment, homogenous combustion is performed by injecting fuel directly into the cylinder so that a homogenous air-fuel mixture is formed at the time of ignition in the cylinder and then igniting the homogenous air-fuel mixture. For example, the crank angle at which to start fuel injection is set based on the fuel injection amount such that the fuel injection will end at a crank angle near the intake stroke bottom dead center, or the crank angle at which to start fuel injection is set to the latter half of each intake stroke irrespective of the fuel injection amount.

The fuel injector 1 has a plurality of injection holes, and fuels F1, F2, and F3 are injected from the respective injection holes obliquely downward toward the exhaust value side wall of the cylinder bore (preferably toward the lower portion of the exhaust valve side wall of the cylinder bore). The thrust force of each of the fuels F1, F2, and F3 injected from the fuel injector 1 is set such that the front of each injected fuel reaches the position at least 60 mm away from the injection hole 1 msec after the beginning of the fuel injection.

As the injected fuels F1, F2, and F3 each having such a strong thrust force move obliquely downward from substantially the center of the upper side of the cylinder toward the exhaust valve side wall of the cylinder bore, the thrust forces of the fuels F1, F2, and F3 intensify the tumble flow T that has been created in the cylinder so as to flow downward in the exhaust valve side of the cylinder and upward in the intake valve side. The tumble flow T thus intensified remains active until the latter half of the compression stroke, whereby the movement of air-fuel mixture can be kept strong until the time of ignition that comes at the end of the compression stroke. The strong movement of air-fuel mixture increases the combustion speed, so that the homogenous combustion progresses in a good condition.

In the third exemplary embodiment, the fuel injector 1 has five injection holes as shown in FIG. 5 and FIG. 6, although the invention is not limited to this. The five fuels injected from these five injection holes are a fuel F1 that is injected in a direction substantially parallel to a plane parallel to the swirling direction of the tumble flow T, two fuels F2 that are injected in directions that clearly cross the plane parallel to the swirling direction of the tumble flow T, and another two fuels F3 that are injected in directions that clearly cross the plane parallel to the swirling direction of the tumble flow T.

The two fuels F2 and the two fuels F3 are injected in the directions that are symmetrical about a plane P that is parallel to the swirling direction of the tumble flow T and on the axis of the cylinder. The angle of the injection direction of each of the two injected fuels F2 with respect to the plane P is smaller than the angle of the injection direction of each of the two injected fuels F3 with respect to the plane P. The injection directions of the two fuels F3 are substantially perpendicular to the plane P in two-dimensional view. That is, the fuels F3 are injected generally along the plane perpendicular to the plane P. As such, in the third exemplary embodiment, fuel is injected to a relatively broad area, and this helps the injected fuel spread throughout the entire area in the cylinder, so that good homogenous air-fuel mixtures are produced.

If other injection holes are provided in addition to the foregoing five injection holes, for example, the injection directions of the additional injection holes are set closer to the exhaust valves 32 than the injection directions of the injected fuels F3 are. By doing so, all the fuels are injected obliquely downward toward the exhaust valve side wall of the cylinder bore (preferably toward the lower portion of the exhaust valve side wall of the cylinder bore), in other words, all the fuels are injected from the fuel injector 1 toward the exhaust valve side of the fuel injector 1 in the cylinder. This arrangement eliminates the possibility that injector the ignition plug 20, which is located on the intake valve side of the fuel injector 1, will get wet due to the injected fuels. As such, the ignition plug 20 can appropriately generate electric arcs at ignition.

In the case where fuel is injected from a plurality of injection holes as described above, all the injected fuels are not always used to intensify the tumble flow T effectively. That is, the fuel F1 that is injected in a direction substantially parallel to the plane parallel to the tumble flow T makes the greatest contribution to the intensification of the tumble flow T. Other injected fuels are less contributive to the intensification of the tumble flow T than the injected fuel F1. That is, the larger the degree of parallelization of the injection direction with respect to the plane parallel to the tumble flow T (the larger the acute side angle at the point at which the injection direction and the plane parallel to the tumble flow T intersect in two-dimensional view), the less the contribution to the intensification of the tumble flow T. Therefore, the fuels F3 that are injected in the directions that are perpendicular to the plane parallel to the tumble flow T hardly contribute to the intensification of the tumble flow T.

In view of the above, in the third exemplary embodiment, the thrust force of the injected fuel F1 that is most contributive to the intensification of the tumble flow T is made larger than the thrust forces of the injected fuels F2 and F3 and the thrust forces of the injected fuels F2 and F3 are reduced correspondingly. By doing so, the tumble flow T can be effectively intensified without increasing the fuel injection amount. In addition, preferably, the greater the contribution to the intensification of the tumble flow, the larger the thrust force of the injected fuel is made. Therefore, the thrust forces of the injected fuels F2 are made larger than the thrust forces of the injected fuels F3.

Figure 7:
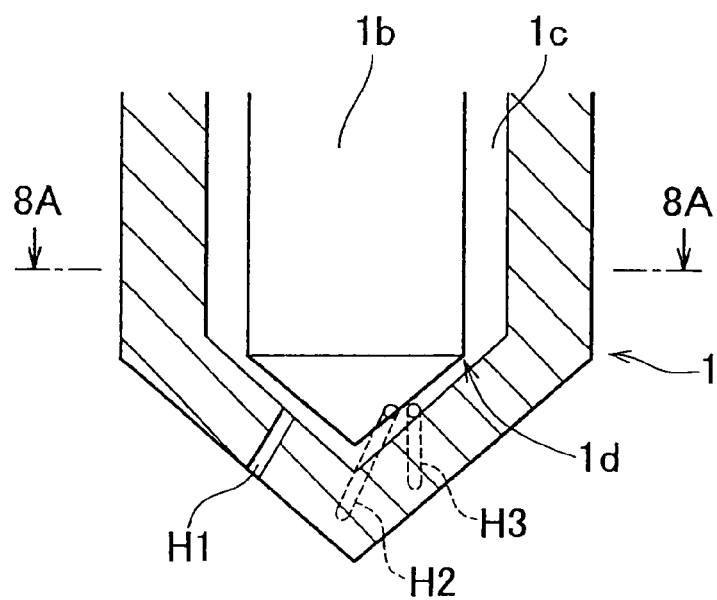
FIG. 7 is a cross-sectional view schematically showing the lower end of the fuel injector.
Figure 8:
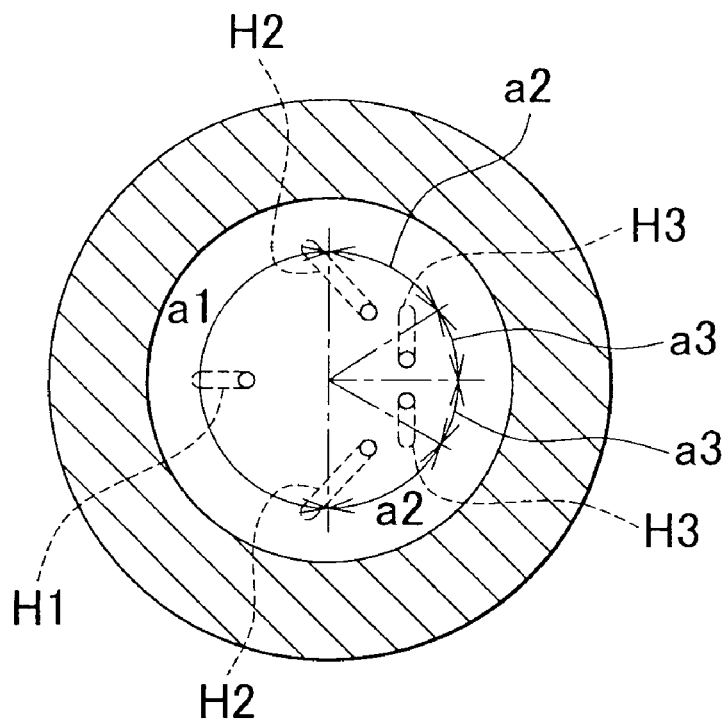
FIG. 8 is a cross-sectional view taken along 8A-8A in FIG. 7 in which the valve element is not shown.

FIG. 7 is a cross-sectional view schematically showing the lower end of the fuel injector 1. FIG. 8 is a cross-sectional view that cuts through the fuel injector 1 along 8A-8A in FIG. 7. Note that a valve element 1b is not shown in the cross-sectional view of FIG. 8. A fuel passage 1c is formed in the fuel injector 1, and a valve element 1b is arranged in the fuel passage 1c. The valve element 1b can move up and down along the axial direction of the fuel injector 1. A first injection hole H1, two second injection holes H2, and two third injection holes H3 are formed at the conical end portion of the fuel injector 1. Fuel injections from the injection holes H1, H2, and H3 are stopped when a seal portion 1d of the valve element 1b is seated on the valve seat portion on the upstream side of the injection holes H1, H2, and H3 at the conical end portion. In response to the seal portion 1d moving away from the valve seat portion as the valve element 1b is lifted up, the high-pressure fuel in a fuel passage 1c is injected through each of the injection holes H1, H2, and H3.

The inner ends of the respective injection holes H1, H2, and H3 are, as shown in FIG. 8, located in a common imaginary circle around the axis of the valve element 1b. The inner end of the first injection hole H1 is located at the center of a first angle a1, the inner end of each second injection hole H2 is located at the center of a second angle a2, and the inner end of each third injection hole H3 is located at the center of a third angle a3. The sum of the first angle a1, the two second angles a2, and the two third angles a3 is 360°.

Briefly speaking, the fuel in the area of the first angle a1 at the conical end portion of the valve element 1b is injected through the first injection hole H1, the fuels in the areas of the second angles a2 are injected through the second injection holes H2, and the fuels in the areas of the third angles a3 are injected through the third injection holes H3. Thus, by setting the first angle a1 to the largest angle (e.g., 180°), the thrust force of the injected fuel F1 that is most contributive to the intensification of the tumble flow T is made larger than the thrust forces of the injected fuels F2 and F3.

Likewise, by setting the second angle a2 larger than the third angle a3 (e.g., a2: 60°, a3: 30°), the thrust forces of the injected fuels F2 that contribute to the intensification of the tumble flow T are made larger than the thrust forces of the injected fuels F3 that make almost no contribution to the intensification of the tumble flow T.

As such, the thrust forces of the injected fuels F3 that are necessary to spread the fuel throughout the entire area in the cylinder but are substantially non-contributive to the intensification of the tumble flow T are reduced. This minimizes the possibility that the injected fuels F3 reach the cylinder bore wall and cause dilution of the engine oil.

While the fuel injector 1 is provided at substantially the center of the upper side of the cylinder, the invention is not limited to this structure. For example, the fuel injector 1 may alternatively be provided between the two exhaust valves 32 at the periphery of the upper side of the cylinder or between the two intake valves 31 at the periphery of the upper side of the cylinder. If the fuel injector 1 is provided between the two exhaust valves 32 provided at the periphery of the upper side of the cylinder, the respective fuels may be injected, for example, toward the exhaust value side of the top face of the piston so that the tumble flow T is intensified. Further, if the fuel injector 1 is provided between the two intake valves 31 provided at the periphery of the upper side of the cylinder, the respective fuels may be injected, for example, toward the upper portion of the exhaust value side wall of the cylinder bore so that the tumble flow T is intensified.

Namely, in any case, the thrust forces of the fuels injected from the respective injection holes can be made different from each other by injecting some of the fuels in a direction substantially parallel to the plane parallel to the tumble flow T and some of the fuels in a direction that clearly crosses the plane parallel to the tumble flow T, as described above.

In the meantime, the amount (weight) of intake air that is drawn into the cylinder per unit time gradually increases from when the intake valves are opened and peaks immediately before the intake valves are closed. Thus, during the fuel injection period near the intake stroke bottom dead center, the intensity of the tumble flow T in the cylinder gradually increases from the beginning of fuel injection to the end of fuel injection. Therefore, the intensity of the tumble flow T is higher in the latter half of the fuel injection period than in the former half.

Figure 9:
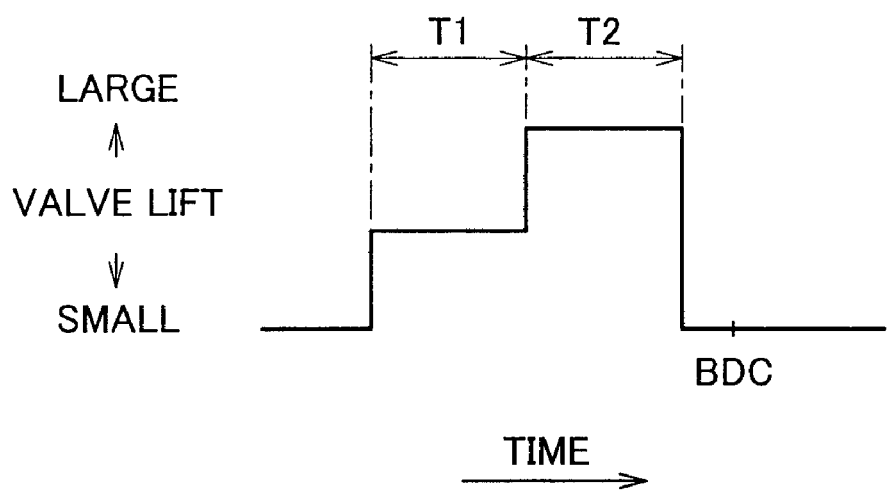
FIG. 9 is a timechart for the lifting of the valve element during the fuel injection period.

If fuel having a large thrust force is injected when the intensity of the tumble flow in the cylinder is low, the injected fuel penetrates the tumble flow. In this case, the kinetic energy of the injected fuel is not sufficiently utilized to intensify the tumble flow. To counter this, in the third exemplary embodiment, the lift of the valve element $1b$ is controlled such that it becomes small in the former half T1 of the fuel injection period and large in the latter half T2, as shown in FIG. 9. The larger the lift of the valve element $1b$, the larger the clearance between the seal portion $1d$ of the valve element $1b$ and the valve seat portion in the fuel passage $1c$. Thus, as the lift of the valve element $1b$ increases, the resistance against the fuel flowing through the clearance between the seal portion $1d$ and the valve seat portion decreases, so that the thrust forces of the fuels injected from the respective injection holes increase.

As such, in order to minimize the possibility that the injected fuels penetrate the tumble flow T, the thrust force of each injected fuel is made larger in the latter half of the fuel injection period where the intake air amount per unit time is large and thus the intensity of the tumble flow is high than in the former half of the fuel injection period where the intake air amount per unit time is small and thus the intensity of the tumble flow is low. As a result, the kinetic energy of each injected fuel is sufficiently utilized to intensify the tumble flow T, reducing the possibility of each injected fuel reaching the cylinder bore wall and thus the possibility of dilution of the engine oil.

The required fuel amount increases as the engine speed increases and as the engine load increases. Therefore, the fuel injection period is extended as the engine speed increases and as the engine load increases. In the fuel injection period thus controlled, the lift of the valve element $1b$ may be always set small in the former half and large in the latter half. Further, in the case where the lift of the valve element $1b$ is adjustable in three steps; large, middle, and small, the lift of the valve element $1b$ may be set to the small lift in the early period, to the middle lift in the middle period, and to the large lift in the late period.

Further, as the required fuel amount increases, the amount of intake air drawn into the cylinder increases on the whole, so that the overall intensity of the tumble flow T increases. In view of this, when the required fuel amount is increasing at least in a predetermined range, the fuel injection amount may be increased by shortening the time period T1, which is the former stage of the fuel injection period where the lift of the valve element $1b$ is made small, and extending the time period T2, which is the latter stage of the fuel injection period where the lift of the valve element $1b$ is made large, as the required fuel amount increases, with the entire length of the fuel injection period unchanged. By doing so, the tumble flow T, which is getting stronger and stronger on the whole at this time, can be intensified. On the other hand, when the required fuel amount is decreasing, the fuel injection amount may be reduced by extending the time period T1 and shortening the time period T2 as the required fuel amount decreases. By doing so, the possibility that the injected fuels penetrate the tumble flow T that is getting weaker and weaker at this time is minimized.

Applications of the above-described valve lift control are not limited to fuel injectors having a plurality of injection holes. For example, the fuel injector 1 may be a fuel injector that injects fuel from a single injection hole into the shape of a solid or hollow cone. Further, the fuel injector 1 may be a fuel injector that injects fuel from a slit-shaped injection hole into a relatively thin fan-like shape. Further, the fuel injector 1 may be a fuel injector that injects fuel from an arc-slit-shaped injection hole into a relatively thin arc shape, the convex side of which faces the upper side and the exhaust valve side. Further, the fuel injector 1 may be a fuel injector that injects fuel from a combination of two or more straight-slit-shaped injection holes into a zigzag shape. In short, the fuel injector 1 may be any type as long as the thrust force of the injected fuel can be made as large as described above and the injection directions are set so as to accelerate the tumble flow T in the cylinder.

In the third exemplary embodiment, because the air-fuel ratio for homogenous combustion is set to a ratio that is leaner than the stoichiometric air-fuel ratio (which is preferably a lean air-fuel ratio for suppressing the production of NOx) to save the fuel consumption, the combustion tends to progress slowly. Therefore, it is very desirable to accelerate the combustion speed as described above. Note that the air-fuel ratio for homogenous combustion may be set to the stoichiometric air-fuel ratio or to a rich air-fuel ratio. In this case, too, it is desirable to accelerate the combustion speed.

The invention claimed is:

1. A direct injection spark ignition internal combustion engine that intensifies a tumble flow using a fuel injected toward a cylinder bore wall at a time near an intake stroke bottom dead center during homogenous combustion, comprising:
 a fuel injector that directly injects fuel into a cylinder,
 wherein thrust force of the fuel injected from the fuel injector to intensify the tumble flow during homogenous combustion is changed based on at least one of a detected or estimated temperature of a surface of the cylinder bore wall, a detected or estimated temperature of the injected fuel, and an orientation of an injection hole.

2. The direct injection spark ignition internal combustion engine according to claim 1, wherein when the detected or estimated temperature of the surface of the cylinder bore wall is lower than a predetermined temperature, the thrust force of the injected fuel is decreased as a detected or estimated temperature of the injected fuel decreases.

3. The direct injection spark ignition internal combustion engine according to claim 1, wherein when the detected or estimated temperature of the injected fuel is higher than a predetermined upper limit value, the fuel injection pressure is decreased such that the fuel injection pressure decreases as the detected or estimated temperature of the injected fuel increases.

4. The direct injection spark ignition internal combustion engine according to claim 3, wherein when the detected or estimated temperature of the injected fuel is lower than a predetermined lower limit value, the temperature of the injected fuel is increased to or above the predetermined lower limit value.

5. The direct injection spark ignition internal combustion engine according to claim 4, wherein
 the temperature of the injected fuel is increased by heating a valve-open actuator by energizing the valve-open actuator so as not to open the fuel injector.

6. The direct injection spark ignition internal combustion engine according to claim 1, wherein when the detected or estimated temperature of the injected fuel is higher than the predetermined upper limit value, the temperature of the injected fuel is decreased to or below the predetermined upper limit value.

7. The direct injection spark ignition internal combustion engine according to claim 6, wherein the temperature of the injected fuel is decreased by cooling the fuel injector using an air flow.

8. The direct injection spark ignition internal combustion engine according to claim 6, wherein when the detected or estimated temperature of the injected fuel is lower than a predetermined lower limit value, the temperature of the injected fuel is increased to or above the predetermined lower limit value.

9. The direct injection spark ignition internal combustion engine according to claim 8, wherein
The temperature of the injected fuel is increased by heating a valve-open actuator by energizing the valve-open actuator so as not to open the fuel injector.

10. The direct injection spark ignition internal combustion engine according to claim 1, wherein
the fuel injector has a plurality of injection holes, and
the thrust force of a fuel that is injected from one of the injection holes in a direction substantially parallel to a plane parallel to the tumble flow is made larger than the thrust force of a fuel that is injected from another of the injection holes in a direction crossing the plane parallel to the tumble flow.

11. The direct injection spark ignition internal combustion engine according to claim 1, wherein
the thrust force of fuel injected from the fuel injector is increased when an amount of intake air that is introduced per unit time during a fuel injection period is larger than when the amount of intake air is small.

12. A fuel injection control method for a direct injection spark ignition internal combustion engine that intensifies a tumble flow using a fuel injected toward a cylinder bore wall at a time near an intake stroke bottom dead center during homogenous combustion and that includes a fuel injector that directly injects fuel into a cylinder,
wherein thrust force of the fuel injected from the fuel injector to intensify the tumble flow during homogeneous combustion is changed based on at least one of a detected or estimated temperature of a surface of the cylinder bore wall, a detected or estimated temperature of the injected fuel, and an orientation of an injection hole.

13. The fuel injection control method according to claim 12, wherein
when the detected or estimated temperature of the surface of the cylinder bore wall is lower than a predetermined temperature, the thrust force of the injected fuel is decreased as a detected or estimated temperature of the injected fuel decreases.

14. The fuel injection control method according to claim 12, wherein
when the detected or estimated temperature of the injected fuel is higher than a predetermined upper limit value, the fuel injection pressure is decreased such that the fuel injection pressure decreases as the detected or estimated temperature of the injected fuel increases.

15. The fuel injection control method according to claim 14, wherein
when the detected or estimated temperature of the injected fuel is lower than a predetermined lower limit value, the temperature of the injected fuel is increased to or above the predetermined lower limit value.

16. The fuel injection control method according to claim 15, wherein
the temperature of the injected fuel is increased by heating a valve-open actuator by energizing the valve-open actuator so as not to open the fuel injector.

17. The fuel injection control method according to claim 12, wherein
when the detected or estimated temperature of the injected fuel is higher than the predetermined upper limit value, the temperature of the injected fuel is decreased to or below the predetermined upper limit value.

18. The fuel injection control method according to claim 17, wherein
the temperature of the injected fuel is decreased by cooling the fuel injector using an air flow.

19. The fuel injection control method according to claim 17, wherein
when the detected or estimated temperature of the injected fuel is lower than a predetermined lower limit value, the temperature of the injected fuel is increased to or above the predetermined lower limit value.

20. The fuel injection control method according to claim 19, wherein
the temperature of the injected fuel is increased by heating a valve-open actuator by energizing the valve-open actuator so as not to open the fuel injector.

21. The fuel injection control method according to claim 12, wherein
the fuel injector has a plurality of injection holes, and
the thrust force of a fuel that is injected from one of the injection holes in a direction substantially parallel to a plane parallel to the tumble flow is made larger than the thrust force of a fuel that is injected from another of the injection holes in a direction crossing the plane parallel to the tumble flow.

22. The fuel injection control method according to claim 12, wherein
the thrust force of fuel injected from the fuel injector is increased when an amount of intake air that is introduced per unit time during a fuel injection period is larger than when the amount of intake air is small.

23. A direct injection spark ignition internal combustion engine comprising:
a fuel injector including a plurality of injection holes through which fuel is directly injected to a broad area in a cylinder, such that the fuel injected by each of the plurality of injection holes does not interfere with each other,
wherein the fuel injected by the plurality of injection holes intensifies a tumble flow at a time near an intake stroke bottom dead center during homogenous combustion, and
wherein thrust force of fuel injected from one of the plurality of fuel injection holes in a direction substantially parallel to a plane parallel to the tumble flow is made larger than thrust force of fuel that is injected from a second of the plurality of injection holes in a direction crossing the plane parallel to the tumble flow.

* * * * *